(12) United States Patent
Reeves

(10) Patent No.: US 7,137,419 B1
(45) Date of Patent: Nov. 21, 2006

(54) USED COOKING OIL PROCESSING APPARATUS

(76) Inventor: Dylan Reeves, 9808 S. Normal, Chicago, IL (US) 60628

( * ) Notice: Subject to any disclaimer, the term of this patent is extended or adjusted under 35 U.S.C. 154(b) by 18 days.

(21) Appl. No.: 11/320,144

(22) Filed: Dec. 28, 2005

(51) Int. Cl.
 *B65B 1/04* (2006.01)

(52) U.S. Cl. ............... 141/340; 210/477; 210/474; 99/446

(58) Field of Classification Search ............ 141/331, 141/340–342, 286, 98; 210/477, 474, 244; 99/446
See application file for complete search history.

(56) References Cited

U.S. PATENT DOCUMENTS

| | | | |
|---|---|---|---|
| 418,719 A * | 1/1890 | Hepburn | 210/406 |
| 1,641,051 A | 8/1927 | Rheney | |
| 2,247,040 A | 6/1941 | Whitsett | |
| 2,369,982 A * | 2/1945 | Richards | 141/106 |
| 3,849,312 A | 11/1974 | Wecker, Sr. | |
| 4,043,916 A | 8/1977 | Wecker, Sr. | |
| 4,328,097 A | 5/1982 | Whaley et al. | |
| 4,604,203 A | 8/1986 | Kyle | |
| 5,160,444 A | 11/1992 | McFarland | |
| 5,865,094 A * | 2/1999 | Kealy | 99/291 |
| 6,355,168 B1 | 3/2002 | White | |

FOREIGN PATENT DOCUMENTS

| | | |
|---|---|---|
| JP | 7265610 | 10/1995 |
| JP | 8187191 | 7/1996 |
| JP | 10202022 | 8/1998 |
| JP | 10295565 | 11/1998 |
| JP | 11035970 | 2/1999 |

* cited by examiner

*Primary Examiner*—Steven O. Douglas
(74) *Attorney, Agent, or Firm*—Michael I. Kroll

(57) ABSTRACT

An oil filtering and storage apparatus comprising housing containing a cooking oil storage receptacle therein with a hingedly attached door providing access to said storage receptacle with the receptacle serving as containment of oil that has been filtered for reuse or unfiltered for disposal.

10 Claims, 17 Drawing Sheets

USED COOKING OIL PROCESSING APPARATUS

BACKGROUND OF THE INVENTION

1. Field of the Invention

The present invention relates generally to receptacles and, more specifically, to an oil filtering and storage apparatus comprising housing containing a cooking oil storage receptacle therein with a hingedly attached door providing access to said storage receptacle with the receptacle serving as containment of oil that has been filtered for reuse or unfiltered for disposal.

Located within the top surface of the housing is an aperture providing access to the cooking oil storage receptacle. Removably positioned within the aperture is a conically shaped funnel having a flange for supporting the funnel within the aperture and extending to a funnel egress aperture that substantially engages the opening of the oil storage receptacle providing means for the storage of unfiltered oil.

Selectively positioned within the funnel is a removable filtering member comprising a wire frame for supporting a paper filter or other appropriate filter medium within the wire frame, which is inserted into and supported by the funnel when it is desired to filter the oil prior to storage.

The housing also has a plurality of support members depending from the exterior base serving as vibration mounts and a lid on the top side covering the funnel giving the apparatus a clean appearance, which can include indicia, graphics or other decorative appliques on the exterior surface as functional or decorative elements.

Additionally, while one oil storage container is depicted, the incorporation of several storage containers is considered for filtered and unfiltered oils as needed.

In the typical disposal operation, the cap is removed from the oil receptacle and positioned within the housing compartment in alignment with the housing funnel egress aperture whereupon the oil is poured into the funnel and collected within the oil receptacle for disposal.

Alternately, for filtered oil the cap is removed from the oil storage receptacle and positioned within the housing compartment in alignment with the funnel. Filter paper or other appropriate filter medium is positioned within the wire frame and placed within the funnel upon supports, oil is poured into the filter paper and again channeled into the oil storage receptacle. Once completed, the cap is threadedly attached to the oil storage receptacle providing a spill proof container of disposable or reusable cooking oil. At the user's discretion the funnel and/or filter medium wire frame support are easily removed for cleaning.

2. Description of the Prior Art

There are other storage device designed for filtering liquids. Typical of these is U.S. Pat. No. 1,641,051 issued to Rheney on Aug. 30, 1927.

Another patent was issued to Whitsett on Jun. 24, 1941 as U.S. Pat. No. 2,247,040. Yet another U.S. Pat. No. 3,849,312 was issued to Wecker, Sr. on Nov. 19, 1974 and still yet another was issued on Aug. 23, 1977 to Wecker, Sr. as U.S. Pat. No. 4,043,916.

Another patent was issued to Whaley et al. on May 4, 1982 as U.S. Pat. No. 4,328,097. Yet another U.S. Pat. No. 4,604,203 was issued to Kyle on Aug. 5, 1986. Another was issued to McFarland on Nov. 3, 1992 as U.S. Pat. No. 5,160,444 and still yet another was issued on U.S. Pat. No. 6,355,168 to White as U.S. Pat. No. 6,355,168.

Another patent was issued to Masatoshi on Oct. 17, 1995 as Japanese Patent No. JP265610. Yet another Japanese Patent No. JP8187191 was issued to Naoto on Jul. 23, 1996. Another was issued to Akiyoshi on Aug. 4, 1998 as Japanese Patent No. JP 10202022. Yet another was issued to Masahiro on Nov. 10, 1998 as Japanese Patent No. JP10295565 and still yet another was issued on Feb. 9, 1999 to Shinichi as Japanese Patent No. JP11035970.

U.S. Pat. No. 1,641,051

Inventor: John H. Rheney

Issued: Aug. 30, 1927

In combination with an oil can provided with an oil discharge spout and an inlet opening in its top wall, an annular flange extending upwardly from the top wall of the can and surrounding the inlet opening, a filter unit adapted for disposition within the opening as well as within said annular flange, said filter unit including a metallic sleeve having a sliding fit in the flange, a substantially inverted conical filter screen carried by the lower end of the sleeve, a laterally extending flange formed on the upper end of the sleeve and adapted to engage over the upper edge of said annular flange for limiting the downward sliding movement of the sleeve, and a hinged lid mounted on the top wall of the oil can for disposition over the opening and the annular flange surrounding the same.

U.S. Pat. No. 2,247,040

Inventor: Henry Whitsett

Issued: Jun. 22, 1939

A hot oil strainer of the class described comprising an open-ended cylindrical member having along its upper edge an annular horizontal flange terminating in an upwardly extending vertical flange to provide an annular seat interiorly of said member, an oil receiving pan secured interiorly of said member intermediate the top and bottom ends thereof; said pan being of inverted conical shape having an oil discharging opening at the apex of the inverted cone, a tube connected to said opening and extending transversely through the wall of said member at a point below said pan, an oil drawoff faucet secured to the outer end of said tube, and a pair of strainers detachably supported within said member above said pan; the bodies of said strainers being each of inverted conical shape and having flat annular flanges surrounding the upper edges thereof for supporting the same upon said annular seat, said strainers being respectively of such shape and positionally so related that while the supporting flanges thereof are in flatwise engagement with each other when resting on said seat the strainer bodies are substantially separated vertically from each other and from the conical oil receiving pan.

U.S. Pat. No. 3,849,312

Inventor: Walter A. Wecker, Sr.

Issued: Nov. 19, 1974

A filter bed assembly comprises a base plate, a filter element and a joining and lifting arrangement. The base plate is adapted to be situated adjacent the floor of a filtration vessel and includes an upright, centrally disposed connection member and a perforate filter plate rigidly affixed to the connection member. The filter element is provided with a central aperture that is sized to admit the connection member of the base plate; and the joining and lifting arrangement includes a frame that is adapted for mechanically securing edge portions of the filter element against a cooperating bowl periphery, a connection element which spans the frame and which is provided with coupling means for releasably engaging the connection member of the base plate, and a handle disposed over the frame.

U.S. Pat. No. 4,043,916

Inventor: Walter A. Wecker, Sr.

Issued: Aug. 23, 1977

An on-line closed-vessel circulating filter is especially adapted for filtering edible cooking oils and the like in fast-food establishments and similar installation. The filter apparatus includes a vessel and cover which enclose a filter assembly. The filter assembly is provided with a foraminous member which supports a filter element. To hold the filter element in place and retain filter aid material and filtrate on the filter element, a gravity clamp member presses the filter element against the foraminous member by inner and outer weight rings. The filter assembly can be removed and replaced by a centrally located lift rod.

U.S. Pat. No. 4,328,097

Inventor: Bennie M. Whatley, et al.

Issued: May 4, 1982

An improved apparatus for filtering frying oil in a cooker apparatus includes the steps of adding diatomaceous earth to oil in the cooking vessel; draining the oil into a drain pan; drawing the oil through a filter positioned in said drain pan, such that said earth is deposited on the surface of said filter; and returning said oil to the cooking vessel. Thereafter, the oil is filtered by the steps of draining the oil into said drain pan such that the earth is not disturbed to any substantial extent off of the surface of said filter; drawing the oil through said filter; and automatically returning said oil to the cooking vessel. The improved apparatus includes attaching said drain pan and filter to said cooker apparatus and positioning a metallic plate between the drain opening of said vessel and said filter such that the oil drained into said drain pan is initially deflected to prevent disturbing the diatomaceous earth deposited on the surface of said filter.

U.S. Pat. No. 4,604,203

Inventor: Robert C. Kyle

Issued: Aug. 5, 1986

A cooking oil filtering apparatus has a frame and a filter supported therein. The filter is an assembly of juxtaposed layers including a filter layer formed of a uniformly porous web comprising randomly distributed, randomly interentangled, synthetic polymeric blown microfibers that are less than 10 microns in diameter and a support layer of highly porous, relatively stiff, light weight sheet material, more porous than the filter layer.

U.S. Pat. No. 5,160,444

Inventor: George E. McFarland

Issued: Nov. 3, 1992

A filtering apparatus and method for removing solid impurities contained within a fluid. A plurality of filters each define successive stages and are linked in series whereby the output from a first filter feeds the input of a second filter and so on. Successive stages remove impurities of progressively smaller particle size whereupon the last stage provides a fluid substantially clean of all impurities and polished for subsequent reuse. The specific environment associated with the instant apparatus and method involves cleaning cooking oil in deep fat fryers.

U.S. Pat. No. 6,355,168

Inventor: Lucious White

Issued: Mar. 12, 2002

A cooking oil storage and filtering system for filtering and storing used cooking oil prior to reuse. The cooking oil storage and filtering system includes an housing assembly with a funnel portion, an upper portion, a bottom portion, a pair of track members, and a housing lid member; a filter assembly which is slidably insertable into the housing assembly along the track members and is designed for removing particulate matter from a quantity of cooking oil, and a kettle assembly, which can be positioned within the bottom portion of the housing and is designed for storing the quantity of cooking oil.

Japanese Patent Number JP7265610

Inventor: Wada Masatoshi, et al.

Issued: Oct. 17, 1995

PURPOSE: To provide a simple filter for edible oil in which the replacement of a filter medium bed for performing the aging prevention and the regeneration of edible oil for business use is accurately and easily performed even by unskilled person.

CONSTITUTION: A filter is provided with an oil storage tank 3 hung from the upper surface of an equipment frame 2 by an upper edge 3a and having a cartridge fitting hole 6 in the recessed part of a bottom 4, a cartridge 5 housing a filter medium bed 7 and provided with an elastic seal material 9 in the shape of a paper cup practically along the outer periphery of an upper edge 8 and further provided with a projection for attaching and detaching 10 projecting upwards practically from the upper edge 8, and a cartridge cover extending from the bottom 4 of the oil storage tank 3 and having an oil takeoff port 12 in the lower part. Also a handle having a inserting tip engaged with an engaging part 15 provided on the suitable number of pairs of projections for attaching detaching 12 is provided to facilitate the replacement of the cartridge 5.

Japanese Patent Number JP8187191

Inventor: Yokose Naoto

Issued: Jul. 23, 1996

PURPOSE: To provide an oil strainer for cooking, which can be handled safely and simply, and is good in view of sanitation, easy to treat after use, and more beautiful in view of design than the conventional article.

CONSTITUTION: An oil strainer for cooking is so constructed that a coffee filter paper 7 is put on a strainer 1, the strainer 1 is fitted in a frame 2 attached to the top plate of a stand 3, an oil receiving container 8 is placed just under the strainer 1 inside the legs 4 of the stand 3, and oil is flowed in the coffee filter paper 7 to be received by the oil receiving container 8.

Japanese Patent Number JP10202022

Inventor: Fukumoto Akiyoshi, et al.

Issued: Aug. 4, 1998

PROBLEM TO BE SOLVED: To neutralize oxidized and deteriorated oil, to adsorb and remove colored components and smells and to purify the oil by using calcium hydroxide, active carbon and activated clay for a filter.

SOLUTION: When the deteriorated oil after cooking is purified, the deteriorated oil is put into a filter part 1 on which filter paper 7 and a net 6 are placed. The oil is dropped into an oil storage part 2 through the filter 3 fitted into the hole 8 in the bottom of a filter housing part 1a. At this time, the active carbon 12 and oily clay 14 adsorb the colored components and smells in the deteriorated oil and the calcium hydroxide 13 neutralizes the oxidized and deteriorated oil at the time the deteriorated oil passes the inside of the filter. The sheet in the cap part 10a of the filter 3 is the filter paper 7 and further removes the fine cooking scum failed to be removed. Then, the deteriorated oil is efficiently purified.

Japanese Patent Number JP10295565

Inventor: Ookouchi Masahiro

Issued: Nov. 10, 1998

PROBLEM TO BE SOLVED: To provide an oil filtering instrument having structure with which oil is hardly dropped from the top end of oil pouring part onto the outer surface of container for collection.

SOLUTION: Concerning an oil filtering device 1, a filter 5 is set to a filter holding part 5 and oil to be filtered is poured so that the oil through the filter 5 can be collected through a liquid passing part 3e at the filter holding part 3 into a main body 2 of container while filtering solid components in oil through that filter 5. An oil pouring part 6 has double structure composed of a 1st expanded part 6a positioned on the outer surface side of the main body 2 of container and a 2nd expanded part 6b formed inside, and the 2nd expanded part 6b is provided so that the position of its upper edge can be higher than the 1 st expanded part 6a. When oil in the main body 2 of container is poured by the oil pouring part 6, oil dropped on the outer surface side of 2nd expanded part 6b is collected through a gap 9 with the 1st expanded part 6a into the main body 2 of container.

Japanese Patent Number JP11035970

Inventor: Ogura Shinichi

Issued: Feb. 9, 1999

PROBLEM TO BE SOLVED: To provide an edible oil filtering apparatus for business use with a good facility in which the filtering material layer can be exchanged easily by any unskillful workers including women, aged and young people.

SOLUTION: An edible oil filtering apparatus having a filtering material for regeneration of an edible oil has at least an exchangeable cartridge 6 which is filled with a sepiolite as the filtering material. In a preferable structure, the cartridge 6 has a flat-box shape and weighs 5–15 kg, a heater 8 for heating an oil to be treated is placed on the top of the cartridge 6, an oil receiving pan 10 is placed under the cartridge 6 and a drain 12 for the regenerated oil which can be opened and closed is placed under the oil receiving pan 10.

While these filtering devices may be suitable for the purposes for which they were designed, they would not be as suitable for the purposes of the present invention, as hereinafter described.

SUMMARY OF THE PRESENT INVENTION

A primary object of the present invention is to provide an apparatus for the storage/containment of cooking oil in either a filtered or unfiltered state.

Another object of the present invention is to provide a used cooking oil processing apparatus wherein the oil is easily deposited into a receptacle either in a filtered or unfiltered condition.

Yet another object of the present invention is to provide a cooking oil processing apparatus having a housing with an interior compartment for the placement of an oil receiving receptacle with said housing having a hingedly mounted door providing access to said interior compartment.

Still yet another object of the present invention is to provide a cooking oil processing apparatus having a housing with an aperture positioned within the top surface serving to receive and support a funnel for channeling deposited oil into the storage receptacle.

An additional object of the present invention is to provide interiorly depending support elements for the wire frame filter paper support.

Another object of the present invention is to provide a cooking oil processing apparatus having a lid with a depending lip for encompassing the funnel rim.

Yet another object of the present invention is to provide a cooking oil processing apparatus having a housing with a plurality of supports depending from the base serving as shock mounts.

Still yet another object of the present invention is to provide a cooking oil processing apparatus having an oil filtering member that can be selectively positioned within the funnel whereby the deposited oil will be filtered prior to storage within said oil storage receptacle.

Another object of the present invention is to provide a cooking oil processing apparatus having a filtering member comprising a wire frame for receiving a filter paper or other appropriate filtering medium.

Yet another object of the present invention is to provide an oil storage receptacle comprising a container with a threaded attached lid.

Still yet another object of the present invention is to provide an oil storage receptacle that is diametrically contoured to aid in the handling of said receptacle.

Additional objects of the present invention will appear as the description proceeds.

The present invention overcomes the shortcomings of the prior art by providing an oil filtering and storage apparatus comprising housing containing a cooking oil storage receptacle therein with a hingedly attached door providing access to said storage receptacle with the receptacle serving as containment of oil that has been filtered for reuse or unfiltered for disposal.

Located within the top surface of the housing is an aperture providing access to the cooking oil storage receptacle. Removably positioned within the aperture is a conically shaped funnel having a flange for supporting the funnel within the aperture and extending to a funnel egress aperture that substantially engages the opening of the oil storage receptacle providing means for the storage of unfiltered oil.

Selectively positioned within the funnel is a removable filtering member comprising a wire frame for supporting a paper filter or other appropriate filter medium within the wire frame, which is inserted into and supported by the funnel when it is desired to filter the oil prior to storage.

The housing also has a plurality of support members depending from the exterior base serving as vibration mounts and a lid on the top side covering the funnel giving the apparatus a clean appearance, which can include indicia, graphics or other decorative appliques on the exterior surface as functional or decorative elements.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
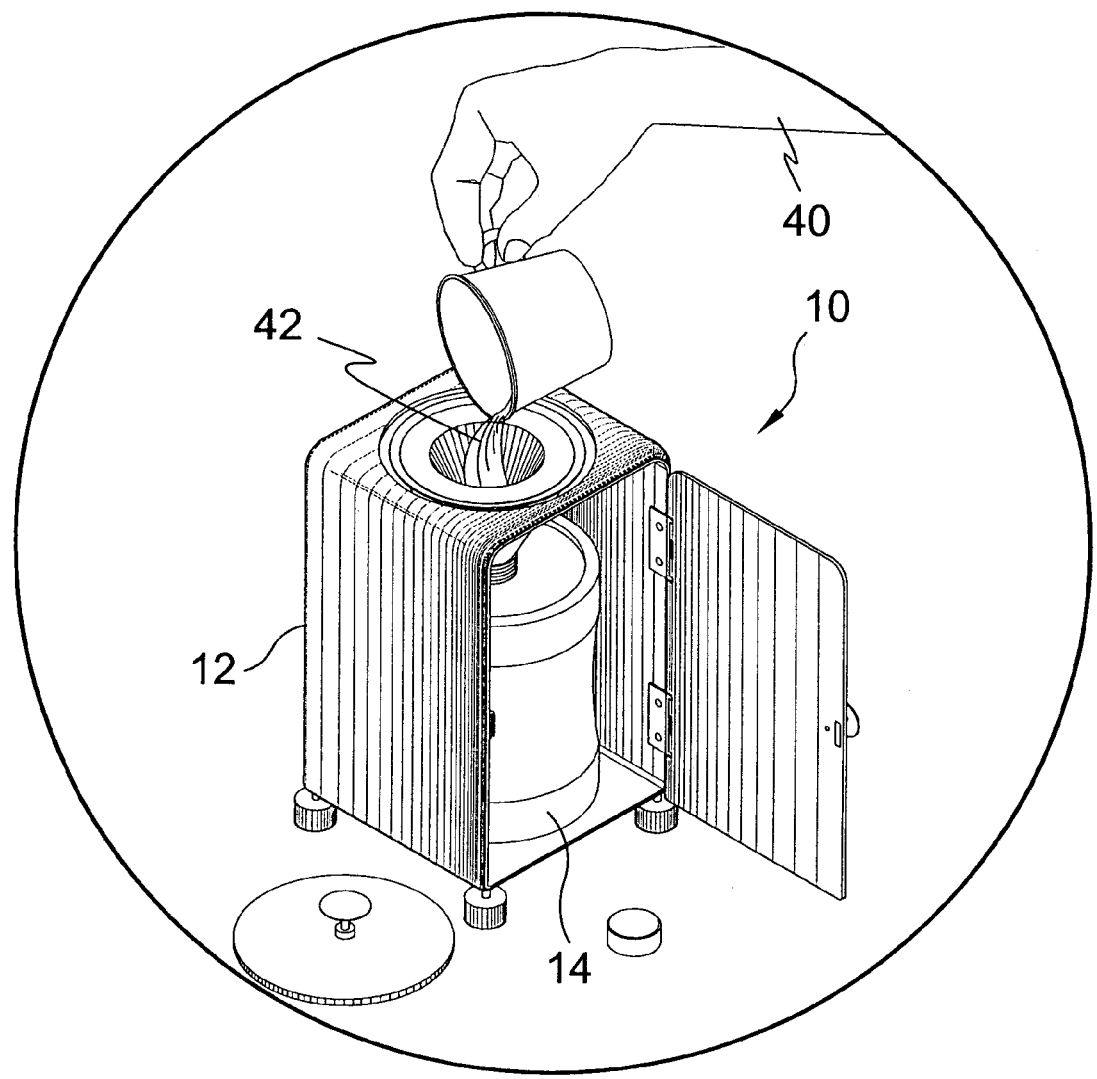
FIG. 1 is an illustrative view of the present invention in use.

Turning now descriptively to the drawings, in which similar reference characters denote similar elements throughout the several views, the figures illustrate the Used Cooking Oil Filter Apparatus of the present invention. With regard to the reference numerals used, the following numbering is used throughout the various drawing figures.

10 Used Cooking Oil Filter Apparatus of the present invention
12 housing
14 oil storage receptacle
18 drain insert recess
19 drain insert
20 housing door
22 hinge
24 doorknob
26 drain insert recess cover member
28 cover knob
30 vibration mount
32 magnetic catch
33 catch
34 cap of 14
36 filter cage
38 filter element
40 user
42 used oil
44 filtered oil
46 tass hooks
48 retaining flange of 19
50 recess of 14

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. Shown is the user 40 pouring used cooking oil 42 into the oil filter apparatus 10 which comprises a housing 12 having a removable oil storage receptacle 14 with the housing 12 having an aperture for a drain insert leading to said storage receptacle and optionally receiving a filter cage and filter element therein. The oil filter apparatus 10 provides for the temporary storage of used oil 42 that is selectively discarded without filtering or selectively filtered of reuse.

Figure 2:
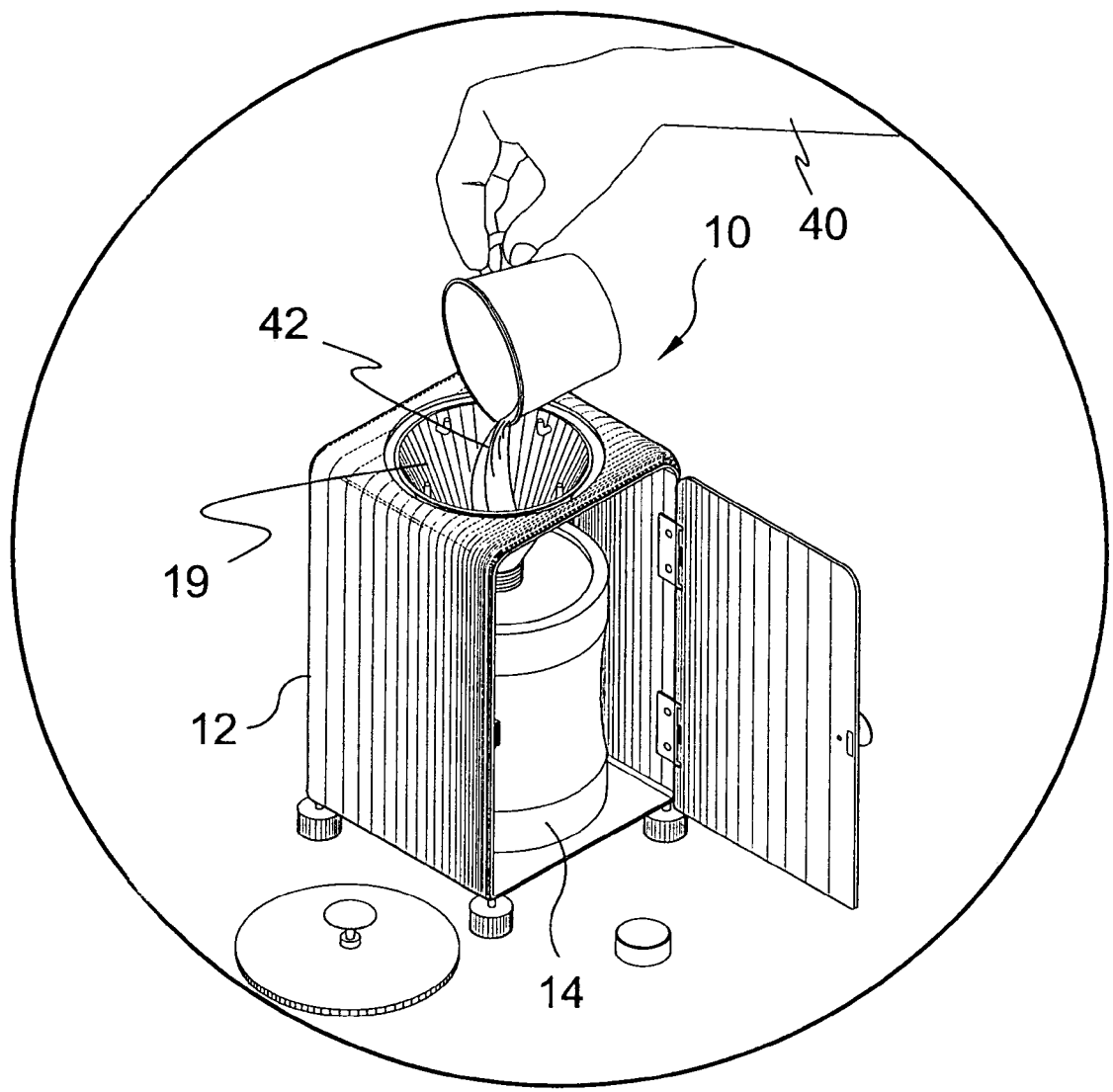
FIG. 2 is an illustrative view of the present invention in use.

FIG. 2 is an illustrative view of the present invention 10 in use. Shown is the user 40 pouring used cooking oil 42 into the oil filter apparatus 10 which comprises a housing 12 having a removable oil storage receptacle 14 with the housing 12 having an aperture for a drain insert 19 leading to said storage receptacle and optionally receiving a filter cage and filter element therein. The oil filter apparatus 10 provides for the temporary storage of used oil 42 that is selectively discarded without filtering or selectively filtered of reuse. Depicted above is typical use of the present invention 10 in which the optional filter cage and filter element are not used.

Figure 3:
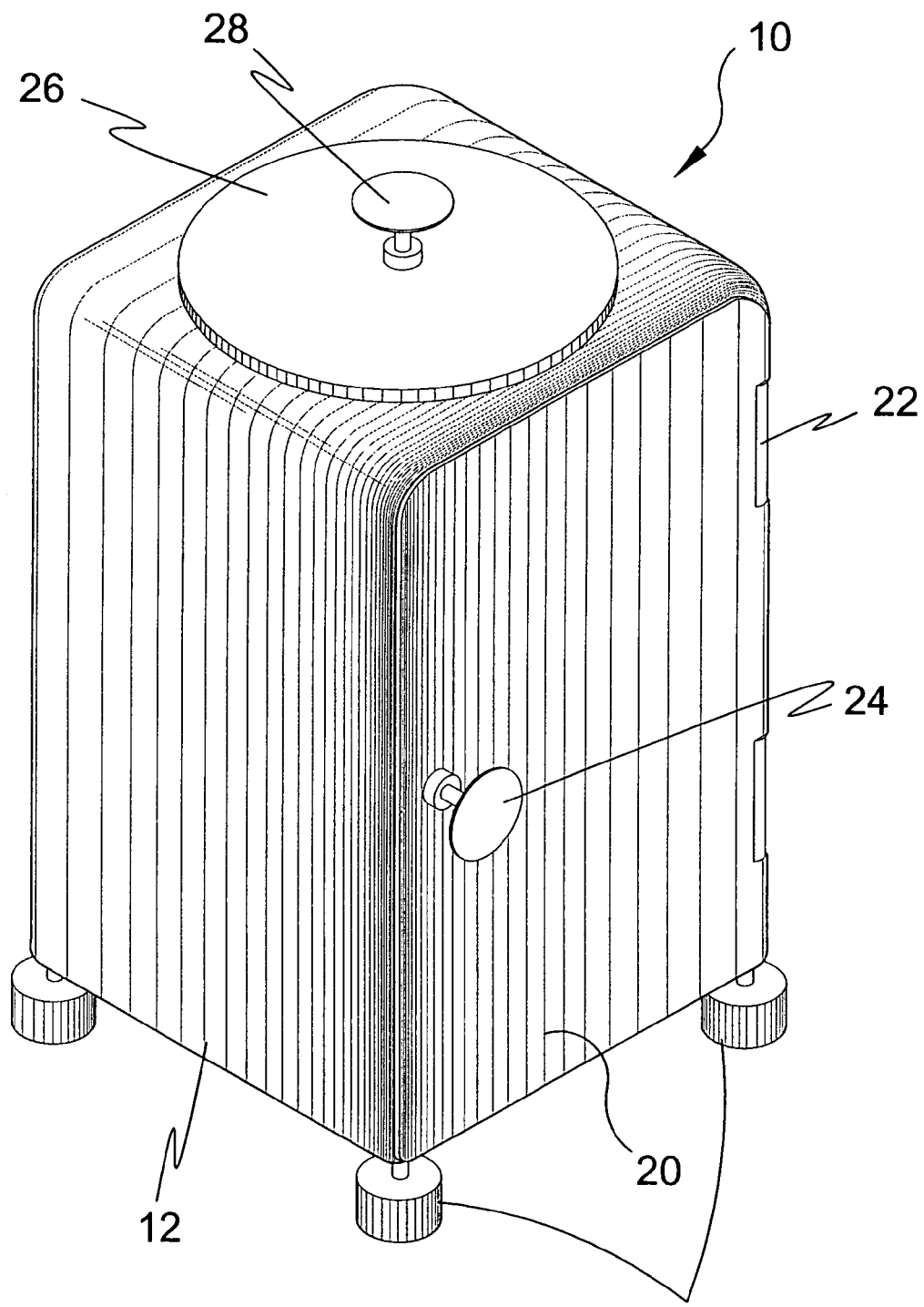
FIG. 3 is a perspective view of the exterior of the present invention.

FIG. 3 is a perspective view of the exterior of the oil container apparatus 10 of the present invention. Its purpose is to filter reusable cooking oil 42 and also designed to dispose of non-reusable cooking oil 42. The housing 12 includes a hinged 22 door 20 with a knob 24, vibration mounts 30 disposed on the underside thereof and a cover member 26 with a knob 28.

Figure 4:
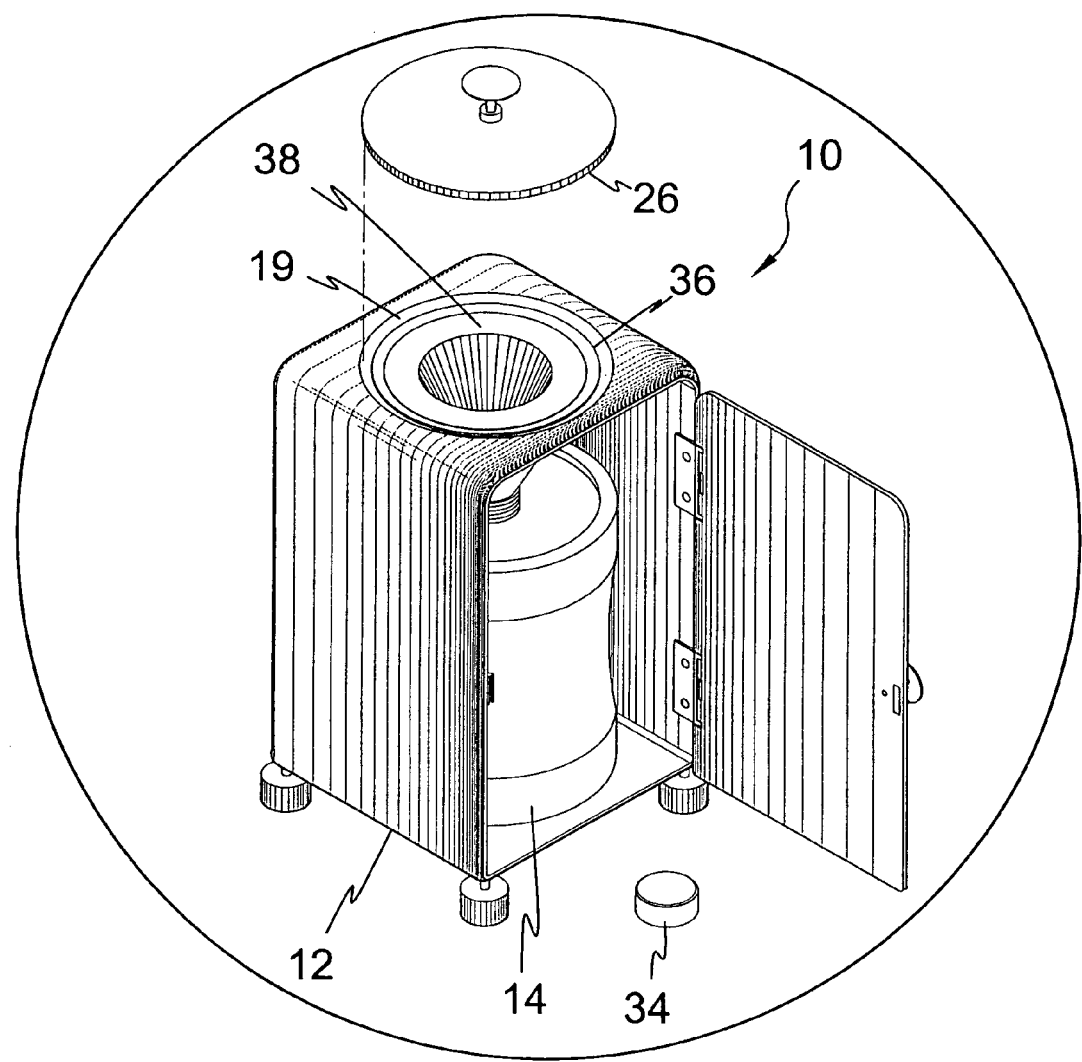
FIG. 4 is a partially open perspective view of the exterior of the present invention.

FIG. 4 is a partially open perspective view of the exterior of the present invention 10. The oil filtering apparatus of the present invention 10 functions as follows: the cover member 26 is removed to pour unprocessed and discarded oil into the unit. The oil cap 34 is removed from the oil storage receptacle 14 and placed inside the housing 12. The drain insert 19 is placed inside the oil cans opening and the filter cage 36 is placed inside the drain insert 19. Thereafter the filter element 38 is placed inside the filter cage 36 which finalizes the units initial set up for productive filtration.

Figure 5:
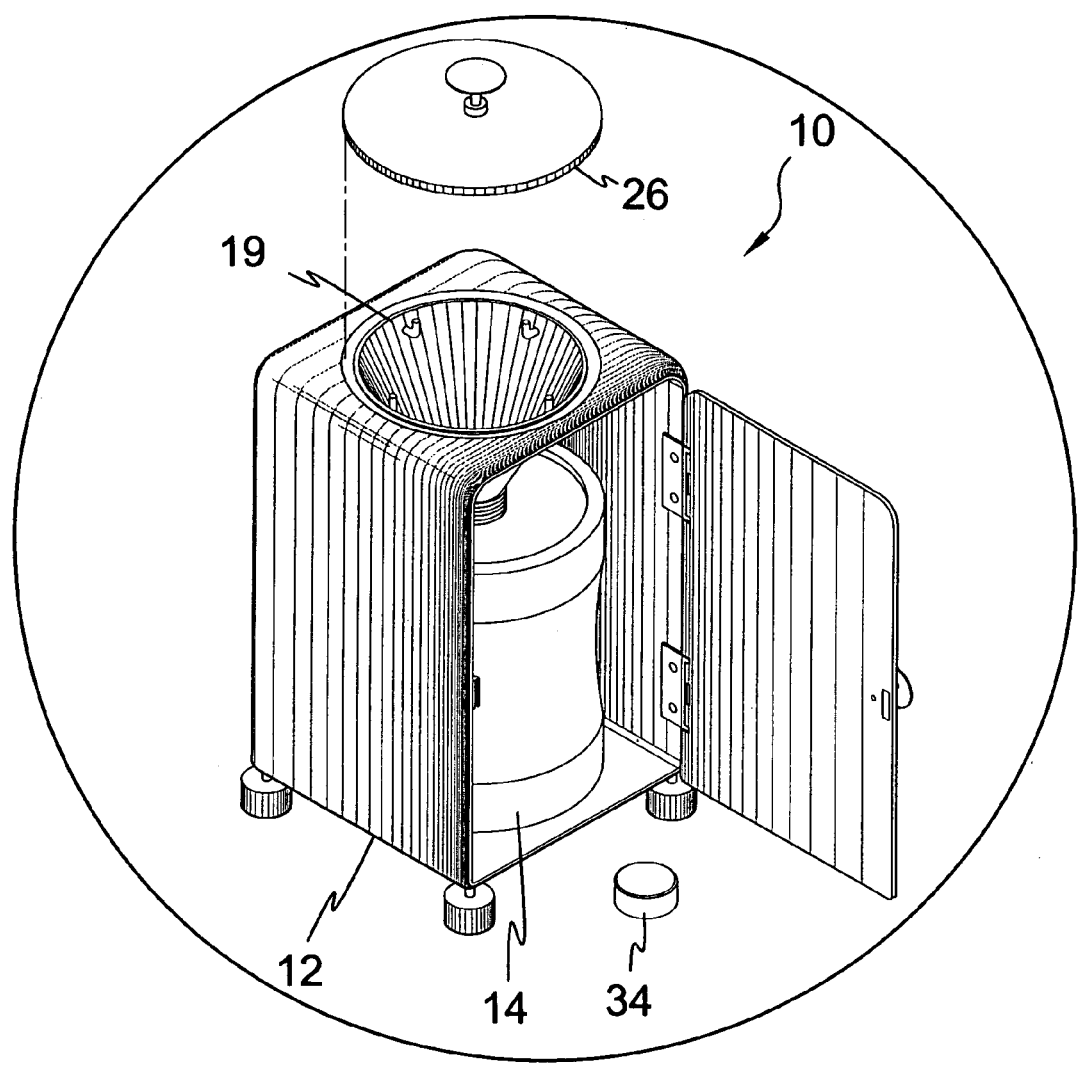
FIG. 5 is a partially open perspective view of the exterior of the present invention.

FIG. 5 is a partially open perspective view of the exterior of the present invention 10. When discarding the oil, the oil filtering apparatus 10 functions as follows; the cover 26 is removed to pour unprocessed and discarded oil into the unit. The oil cap 34 is removed from the oil storage receptacle 14 and placed inside the housing 12. Only the drain insert 19 is placed inside the housing aperture.

Figure 6:
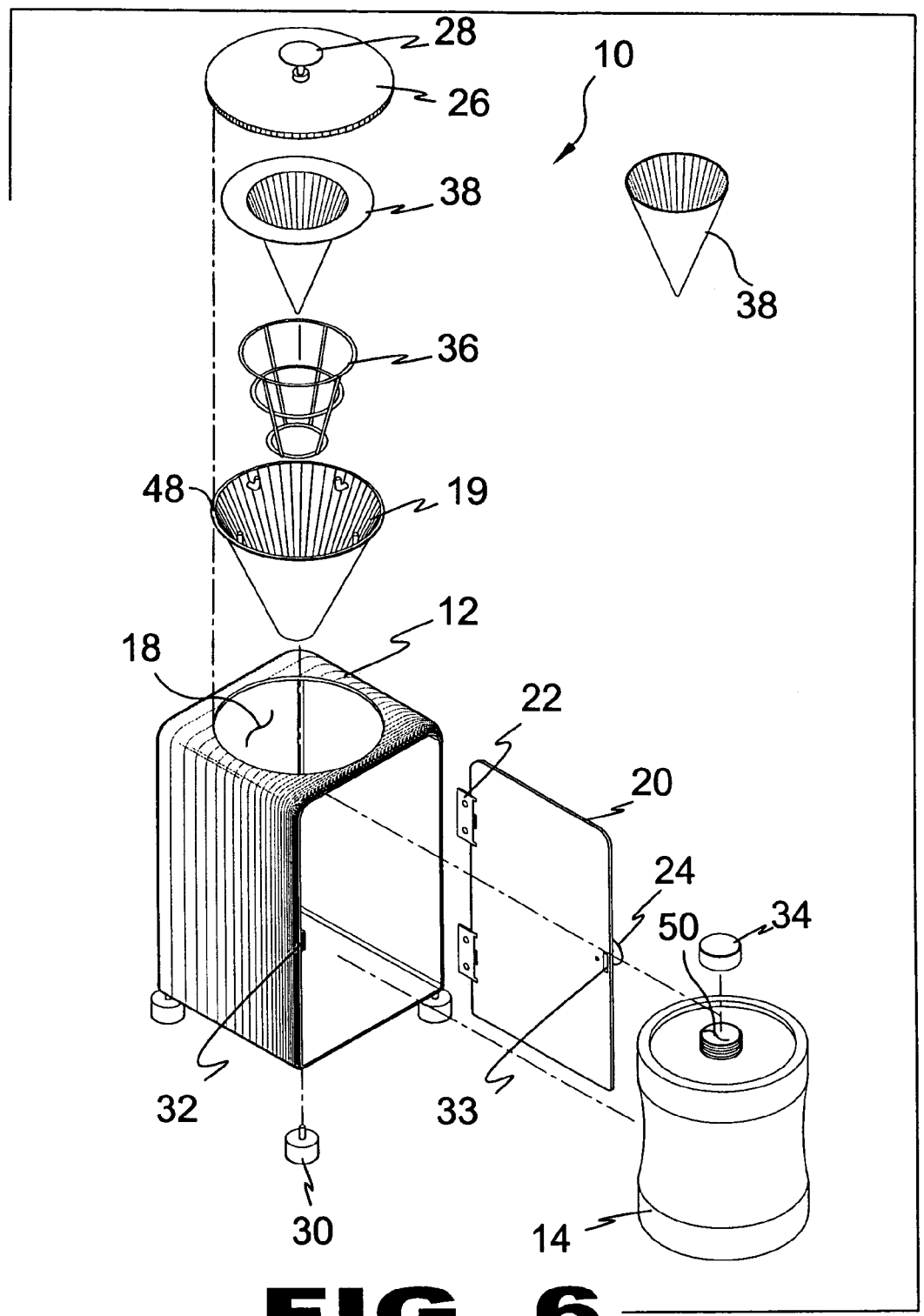
FIG. 6 is an exploded view of the present invention.

FIG. 6 is an exploded view of the present invention 10. Shown is an exploded view of the components of the present invention 10. The oil filter apparatus 10 comprises a housing 12 having an interior for placement of a removable oil storage receptacle 14 therein and a drain insert recess 18 disposed on the top portion thereof for a drain insert 19 having a retaining flange 48 that sits atop the housing 12, the lower end of the drain insert 19 enters the recess 50 of the storage receptacle 14. An optional filter cage 36 and filter element 38 may be placed within the drain insert 19 to remove any sediment or particulate matter from the oil. Vibration mounts 30 are disposed on the bottom of the housing 12 and a hinged 22 door 20 provides access to the interior thereof. A magnetic catch 32 and metallic catch 33 provide a releasable securing means for keeping the door 20 closed and a knob 24 provides a gripping means for opening the door. A cover member 26 with a gripping knob 28 is provided to cover drain insert recess 18 when not in use. A threaded cap 34 is further included to secure the oil storage receptacle 14 during transport and storage.

Figure 7:
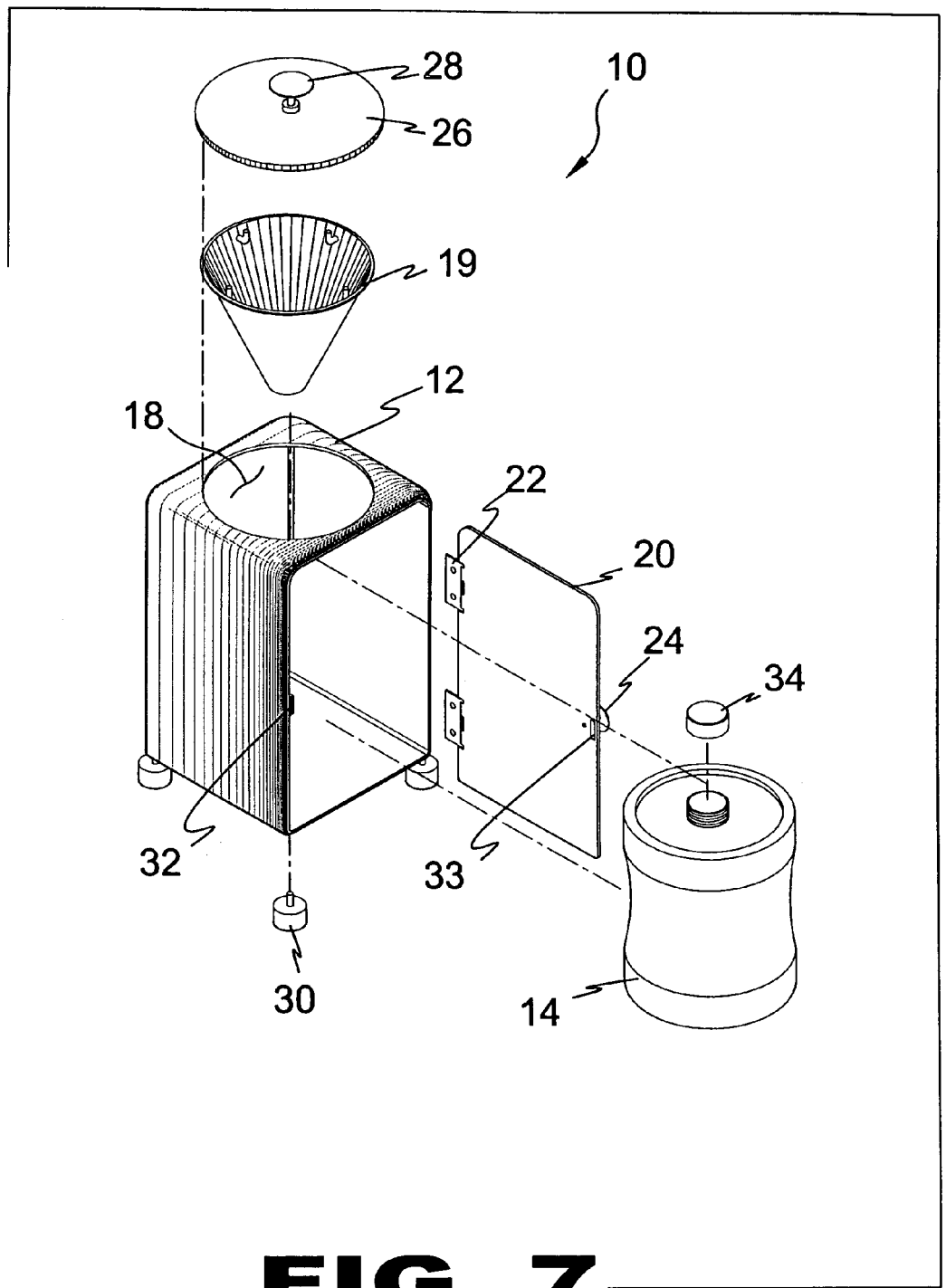
FIG. 7 is an exploded view of the present invention.

FIG. 7 is an exploded view of the present invention 10. Shown is an exploded view of the components of the present invention 10. The oil filter apparatus 10 comprises a housing 12 having an interior for placement of a removable oil storage receptacle 14 therein and a drain insert recess 18 disposed on the top portion thereof for a drain insert 19 leading to said storage receptacle therein. Vibration mounts 30 are disposed on the bottom of the housing 12 and a hinged 22 door 20 provides access to the interior thereof. A magnetic catch 32 and metallic catch 33 provide a releasable securing means for keeping the door 20 closed and a knob 24 provides a gripping means for opening the door. A cover member 26 with a gripping knob 28 is provided to cover drain insert recess 18 when not in use. A threaded cap 34 is further included to secure the oil storage receptacle 14 during transport and storage.

Figure 8:
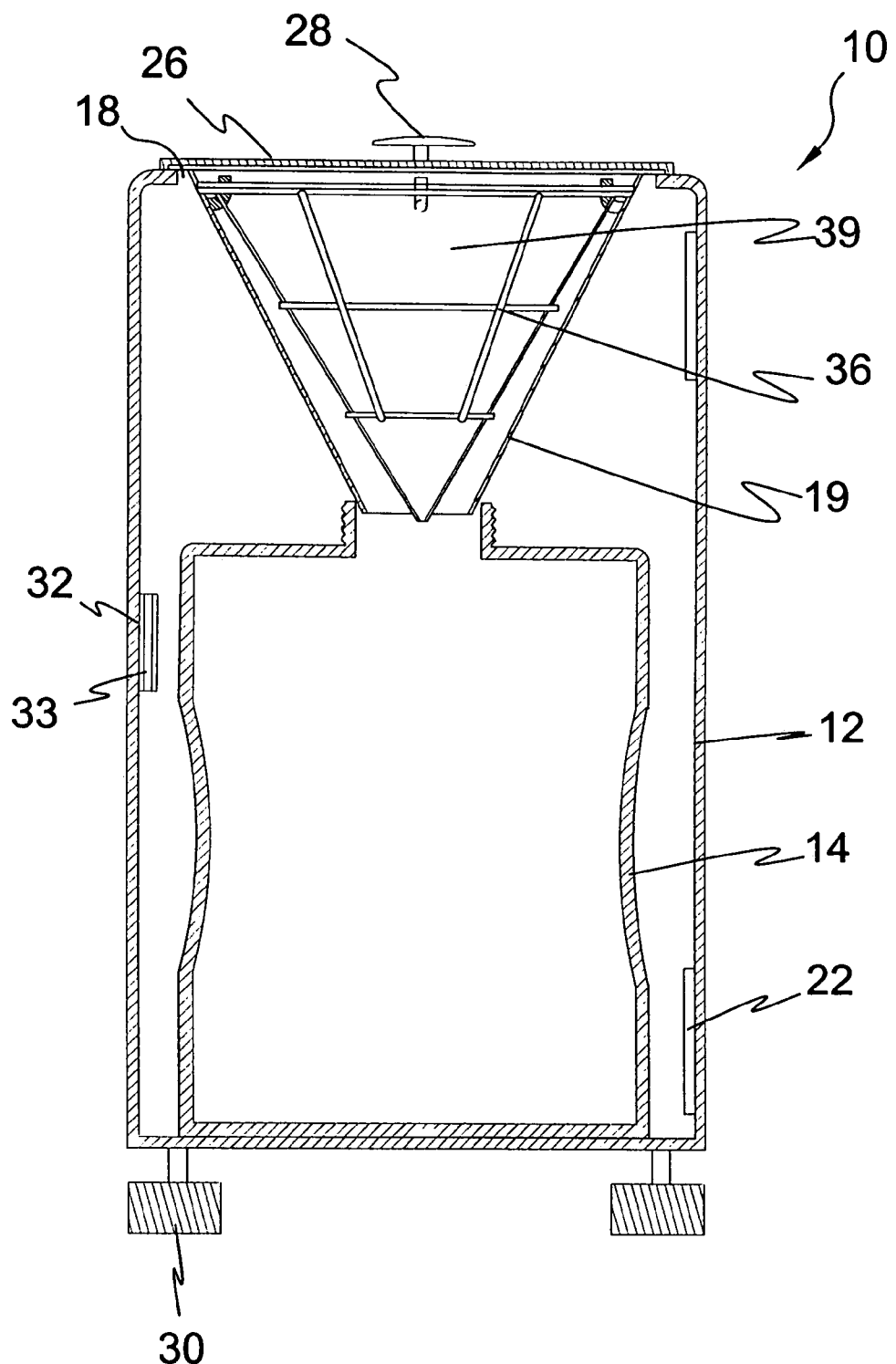
FIG. 8 is a sectional view of the present invention.

FIG. 8 is a sectional view of the present invention 10. The oil filter apparatus 10 comprises a housing 12 having an interior for placement of a removable oil storage receptacle 14 therein and a drain insert recess 18 disposed on the top portion thereof for a drain insert 19 leading to said storage receptacle 14 and optionally receiving a filter cage 36 and filter element 38 therein. Vibration mounts 30 are disposed on the bottom of the housing 12 and a hinged 22 door provides access to the interior thereof. A magnetic catch 32 and metallic catch 33 provide a releasable securing means for keeping the door closed and a knob 24 provides a gripping means for opening the door. A cover member 26 with a gripping knob 28 is provided to cover drain insert recess 18 when not in use.

Figure 9:
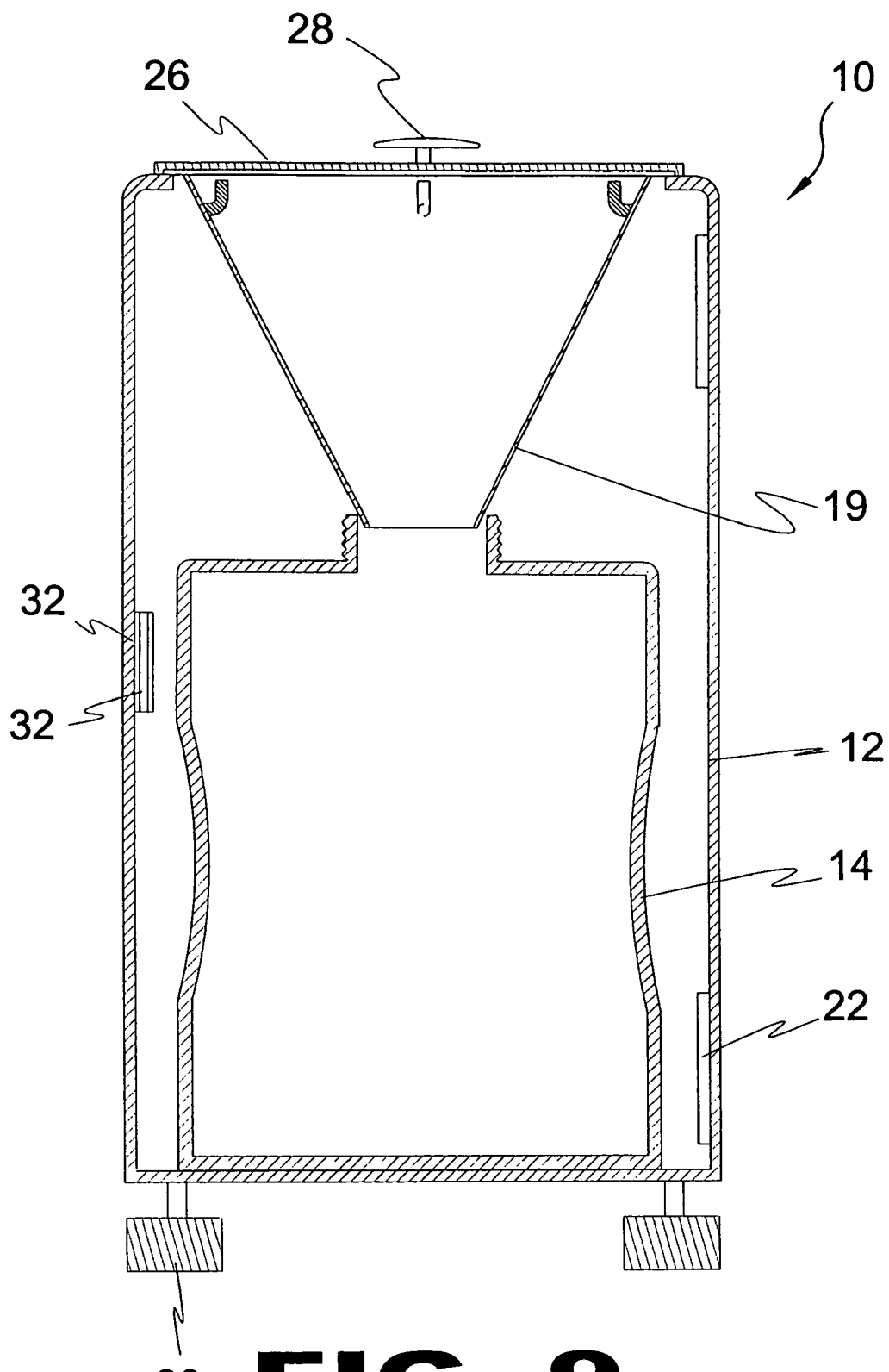
FIG. 9 is a sectional view of the present invention.

FIG. 9 is a sectional view of the present invention 10. The oil filter apparatus 10 comprises a housing 12 having an interior for placement of a removable oil storage receptacle 14 therein and a drain insert recess 18 disposed on the top portion thereof for a drain insert 19 leading to said storage receptacle 14. Vibration mounts 30 are disposed on the bottom of the housing 12 and a hinged 22 door provides access to the interior thereof. A magnetic catch 32 and metallic catch 33 provide a releasable securing means for keeping the door closed and a knob 24 provides a gripping means for opening the door. A cover member 26 with a gripping knob 28 is provided to cover drain insert recess 18 when not in use.

Figure 10:
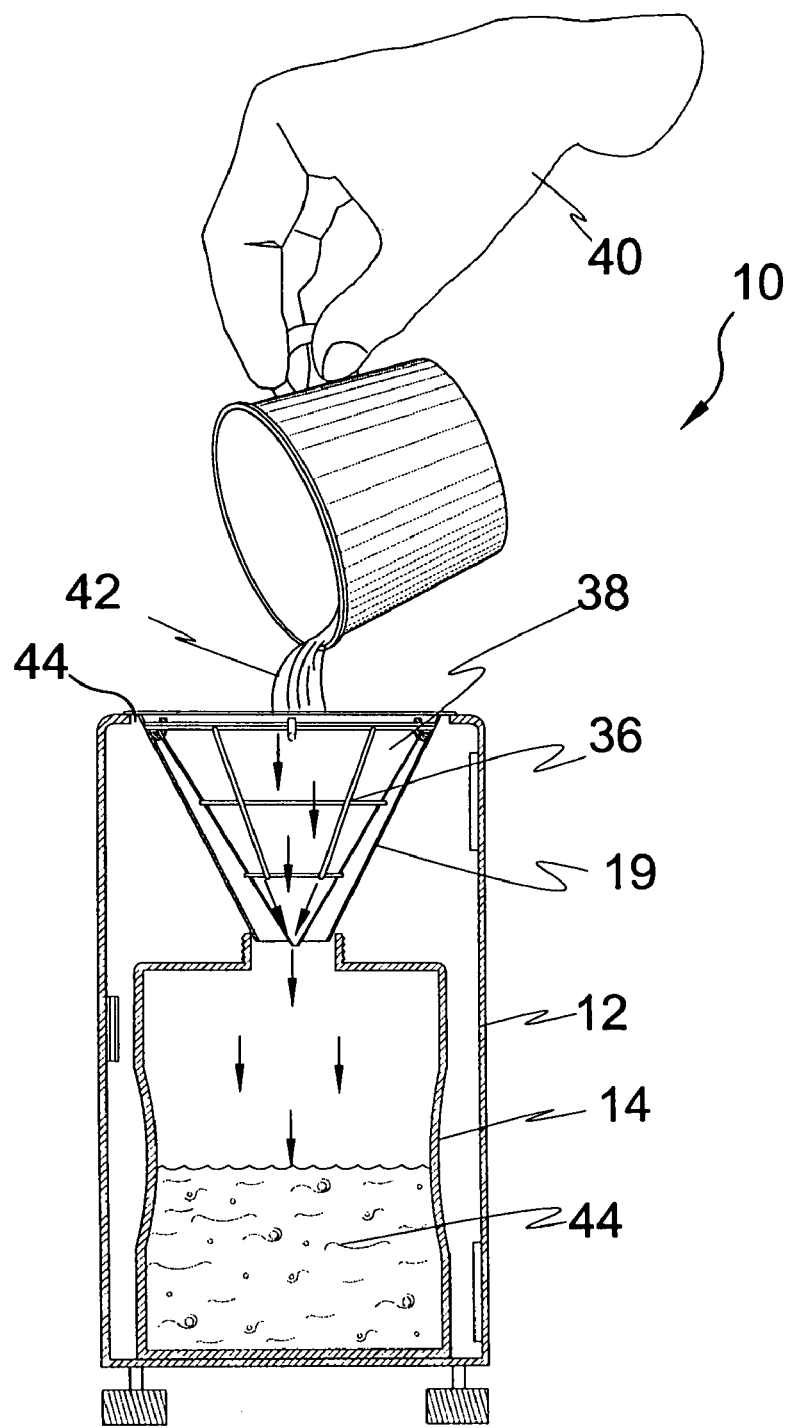
FIG. 10 is a sectional view of the present invention.

FIG. 10 is a sectional view of the present invention 10. To use the oil filtering apparatus of the present invention 10 the lid is removed to allow the user 40 to pour unprocessed and discarded oil 42 into the unit. The oil cap is removed from the oil storage receptacle 14 which is placed inside the housing 12. The drain insert 19 is placed inside the drain insert recess 18 and the filter cage 36 is placed therein. Thereafter the filter element 38 is placed inside the filter cage 36 to remove sediment and particular matter from the used oil 42 thereby resulting in filtered oil 44 being introduced into the oil storage receptacle 14.

Figure 11:
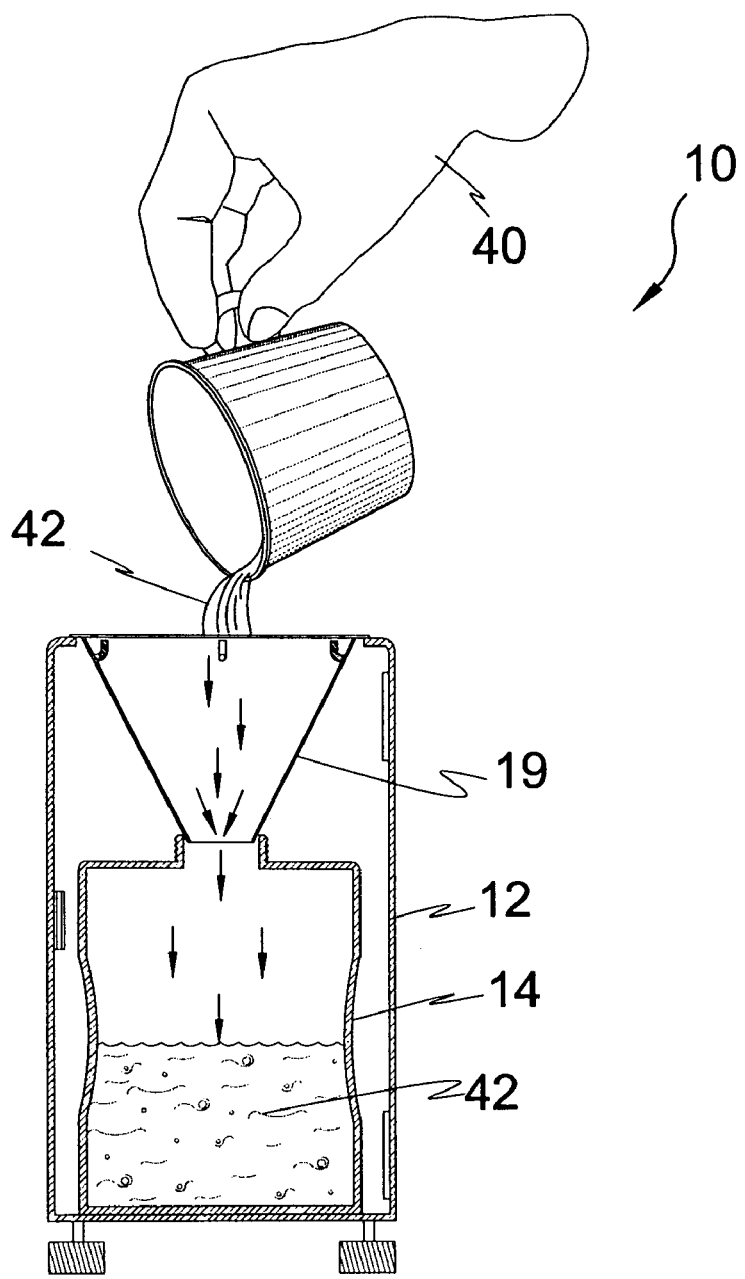
FIG. 11 is a sectional view of the present invention.

FIG. 11 is a sectional view of the present invention 10. To use the oil filtering apparatus of the present invention 10 the lid is removed to allow the user 40 to pour unprocessed and discarded oil 42 into the unit. The oil cap is removed from the oil storage receptacle 14 which is placed inside the housing 12. The drain insert 19 is placed inside the drain insert recess 18 and the used oil 42 is poured therein and introduced into the oil storage receptacle 14.

Figure 12:
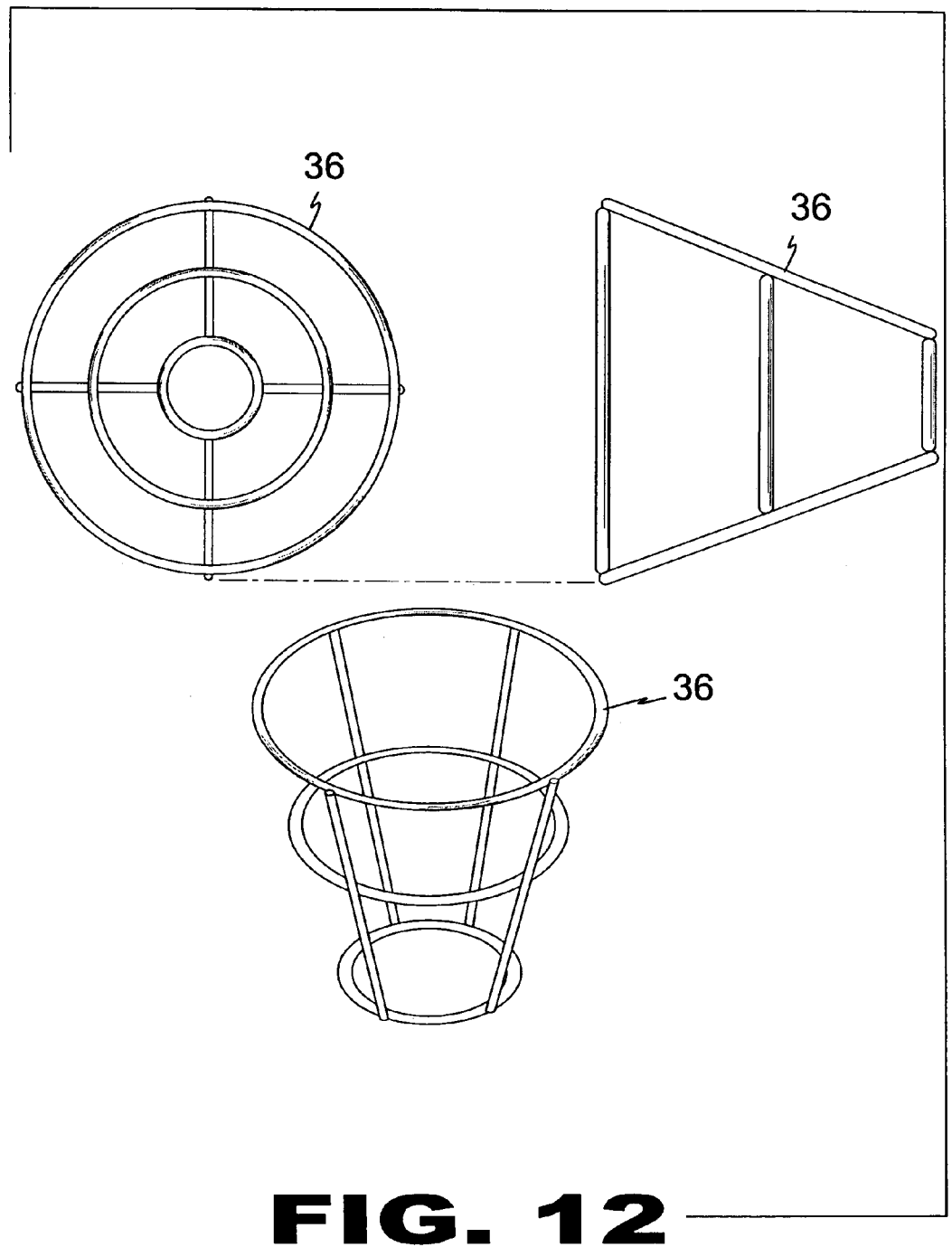
FIG. 12 are structural views of the oil strainer filter cage of the present invention.

FIG. 12 is structural views of the oil strainer filter cage 36 of the present invention. The filter cage 36 is placed inside the drain insert. Thereafter the paper filter is placed inside the filter cage 38 which concludes the units initial set up for productive filtration.

Figure 13:
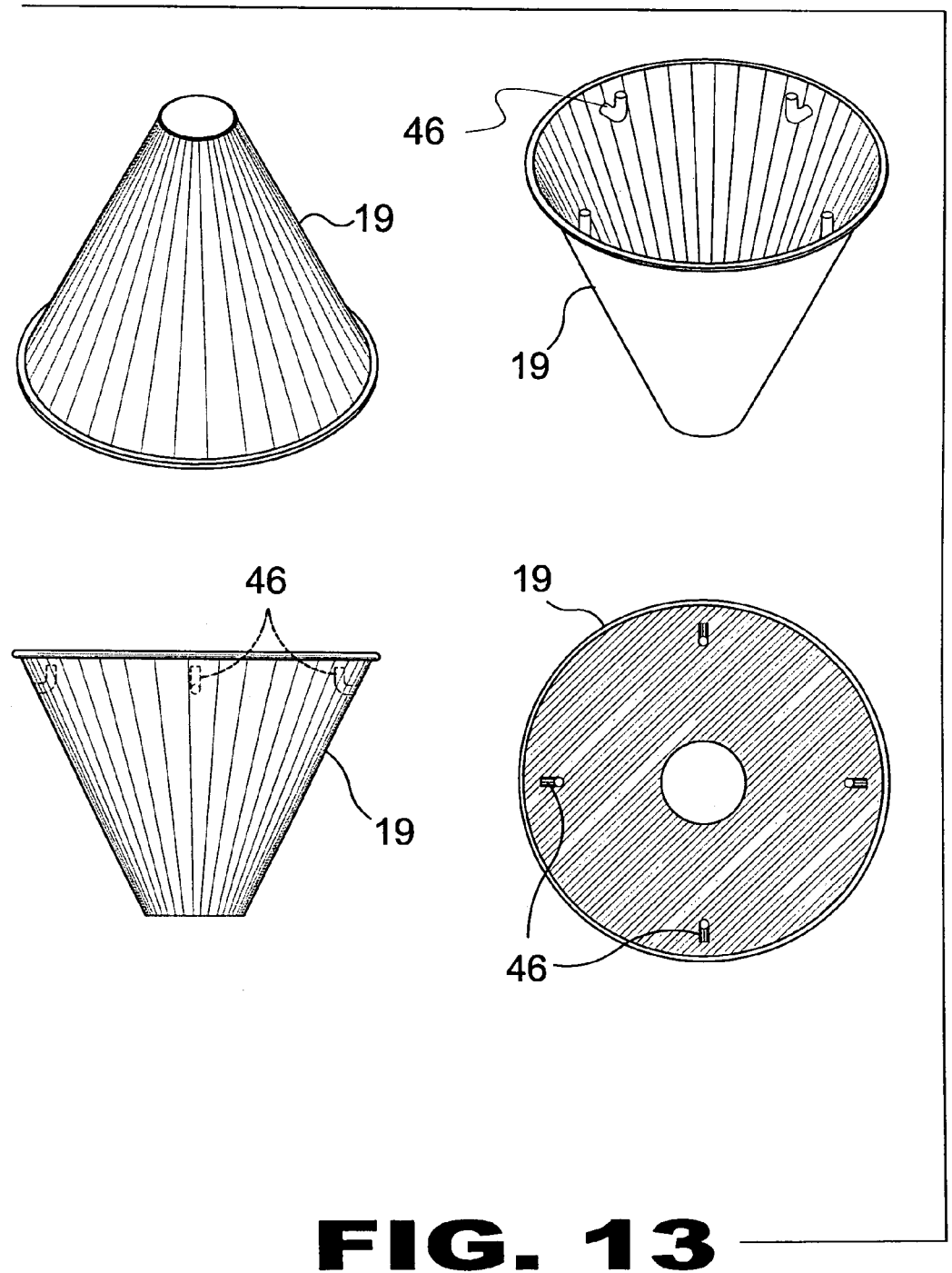
FIG. 13 are illustrative views of the oil drain funnel of the present invention.

FIG. 13 is structural views of the oil strainer drain insert 19 of the present invention. The drain insert 19 is placed inside the oil cans opening and the filter cage is placed inside the drain insert 19 and supported by tass hooks 46. Thereafter the paper filter is placed inside the filter cage 19.

Figure 14:
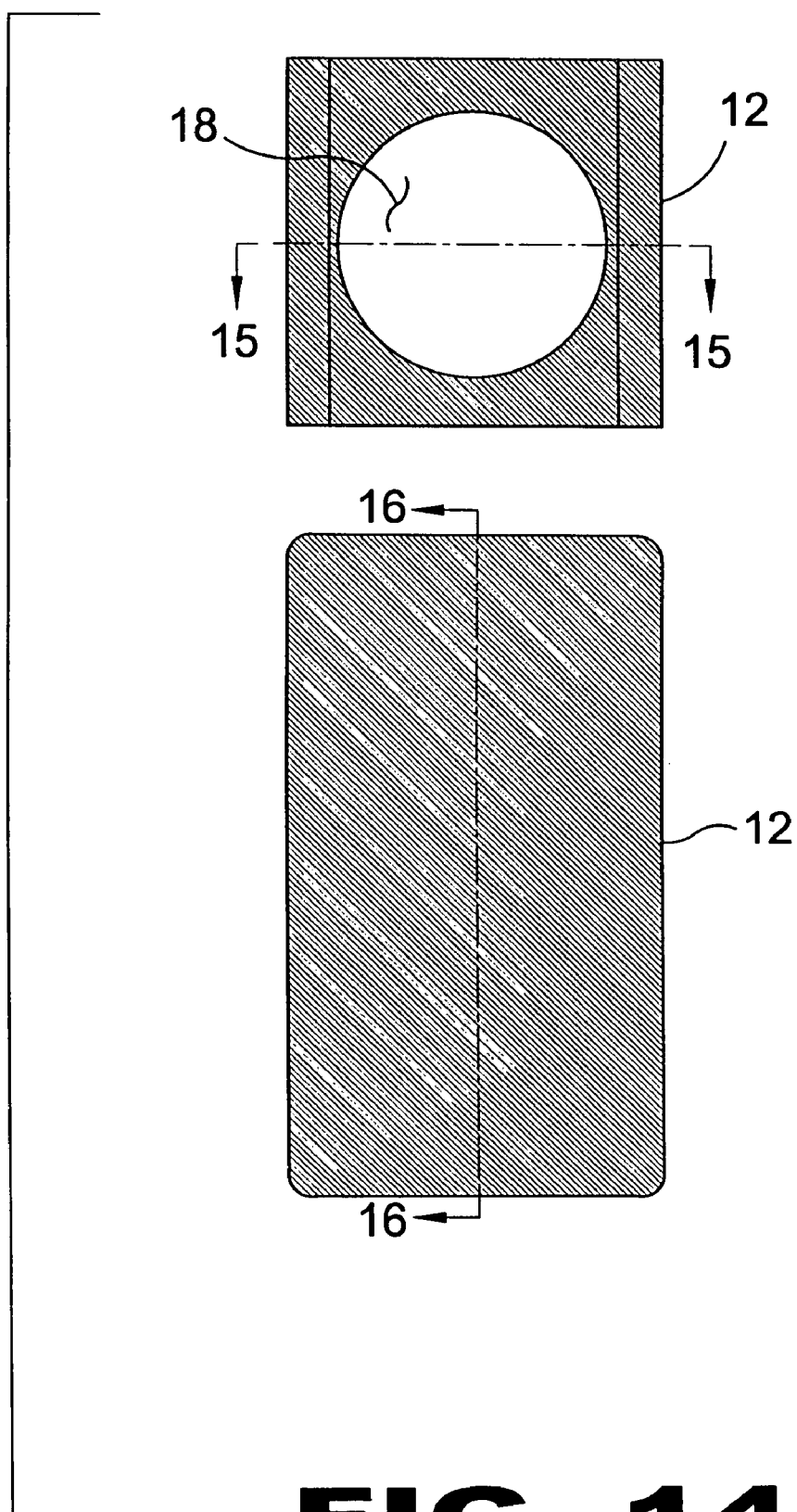
FIG. 14 are plan views of the present invention.

FIG. 14 is an orthographic view of the housing 12. This oil filter apparatus comprises a housing 12 having a removable oil storage receptacle with said housing 12 having a drain insert recess 18 for a drain insert leading to said storage receptacle and optionally receiving a filter cage and filter element therein. Said oil filter apparatus serving means for temporary storage of used oil that is selectively discarded without filtering or selectively filtered of reuse.

Figure 15:
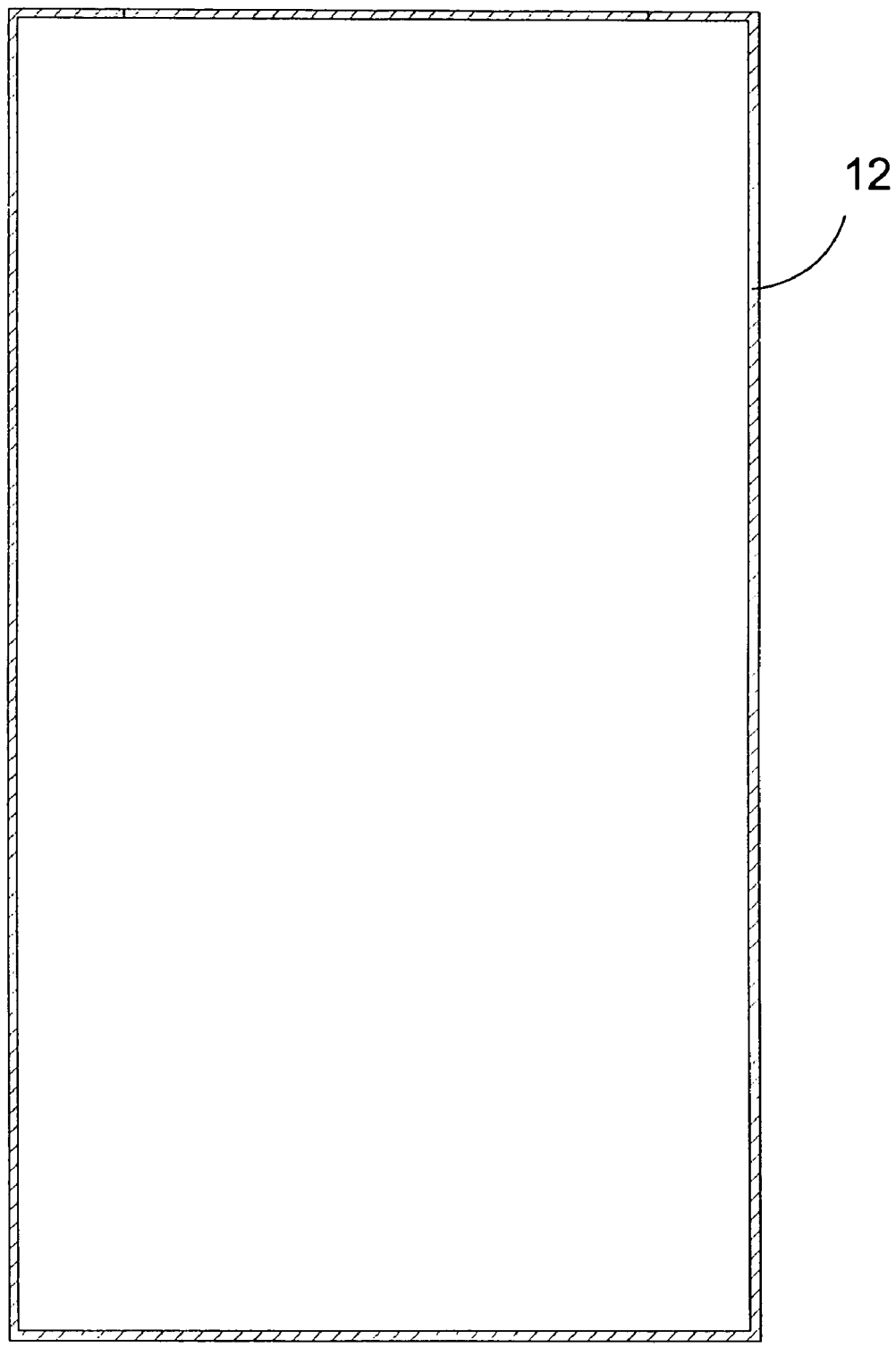
FIG. 15 is an orthographic view of the housing of the present invention.

FIG. 15 is an orthographic view of the housing 12 of the present invention. Shown is an orthographic view of the housing 12 of the present invention as cut from FIG. 14. The oil filter apparatus comprises a housing 12 having a removable oil storage receptacle with said housing 12 having an aperture for a drain insert leading to said storage receptacle and optionally receiving a filter cage and filter element therein. Said oil filter apparatus serving means for temporary storage of used oil that is selectively discarded without filtering or selectively filtered of reuse.

Figure 16:
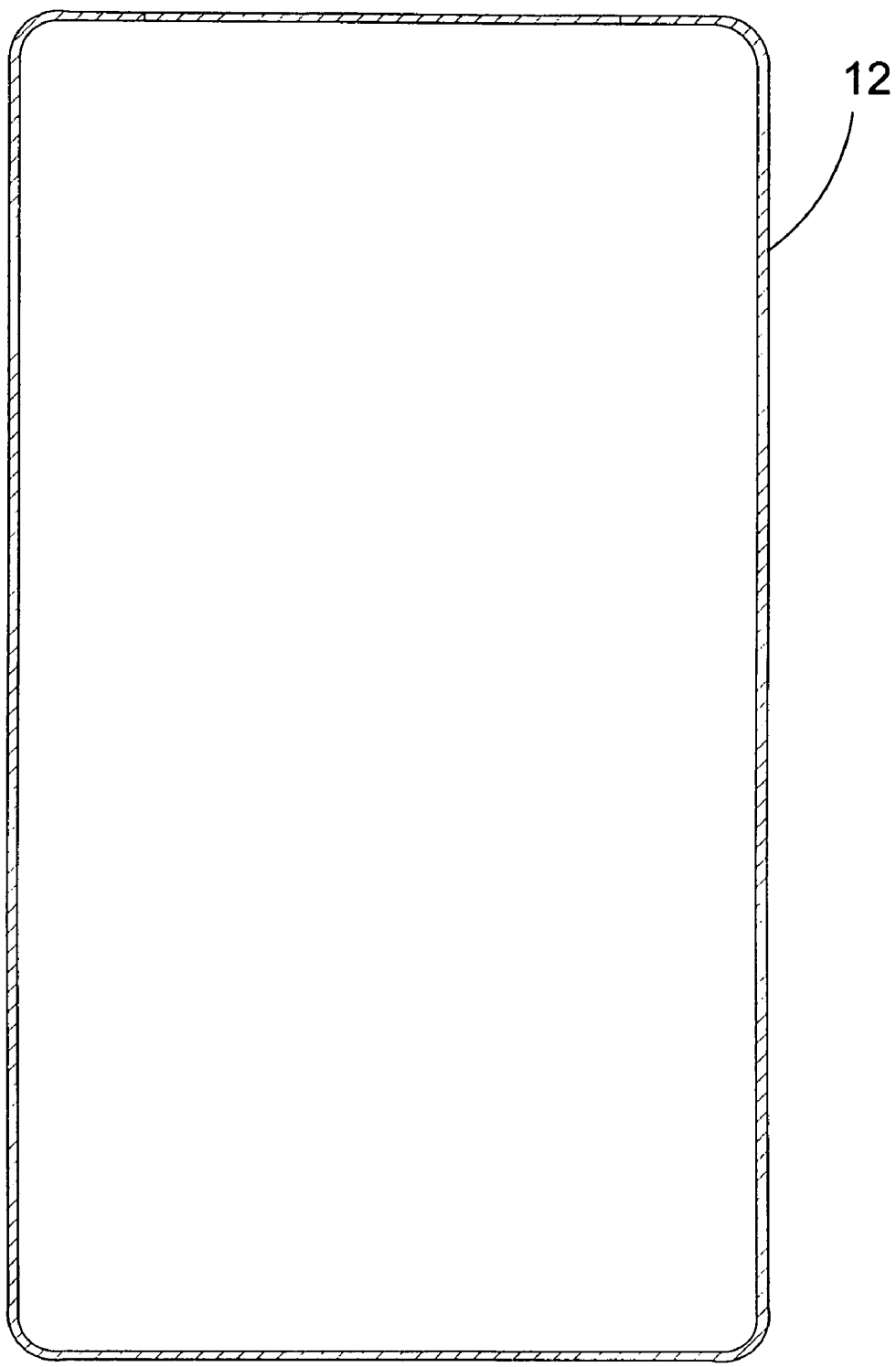
FIG. 16 is an orthographic view of the housing of the present invention.

FIG. 16 is an orthographic view of the housing 12 of the present invention. Shown is an orthographic view of the housing 12 of the present invention as cut from FIG. 14. The oil filter apparatus comprises a housing 12 having a removable oil storage receptacle with said housing 12 having an aperture for a drain insert leading to said storage receptacle and optionally receiving a filter cage and filter element therein. Said oil filter apparatus serving means for temporary storage of used oil that is selectively discarded without filtering or selectively filtered of reuse.

Figure 17:
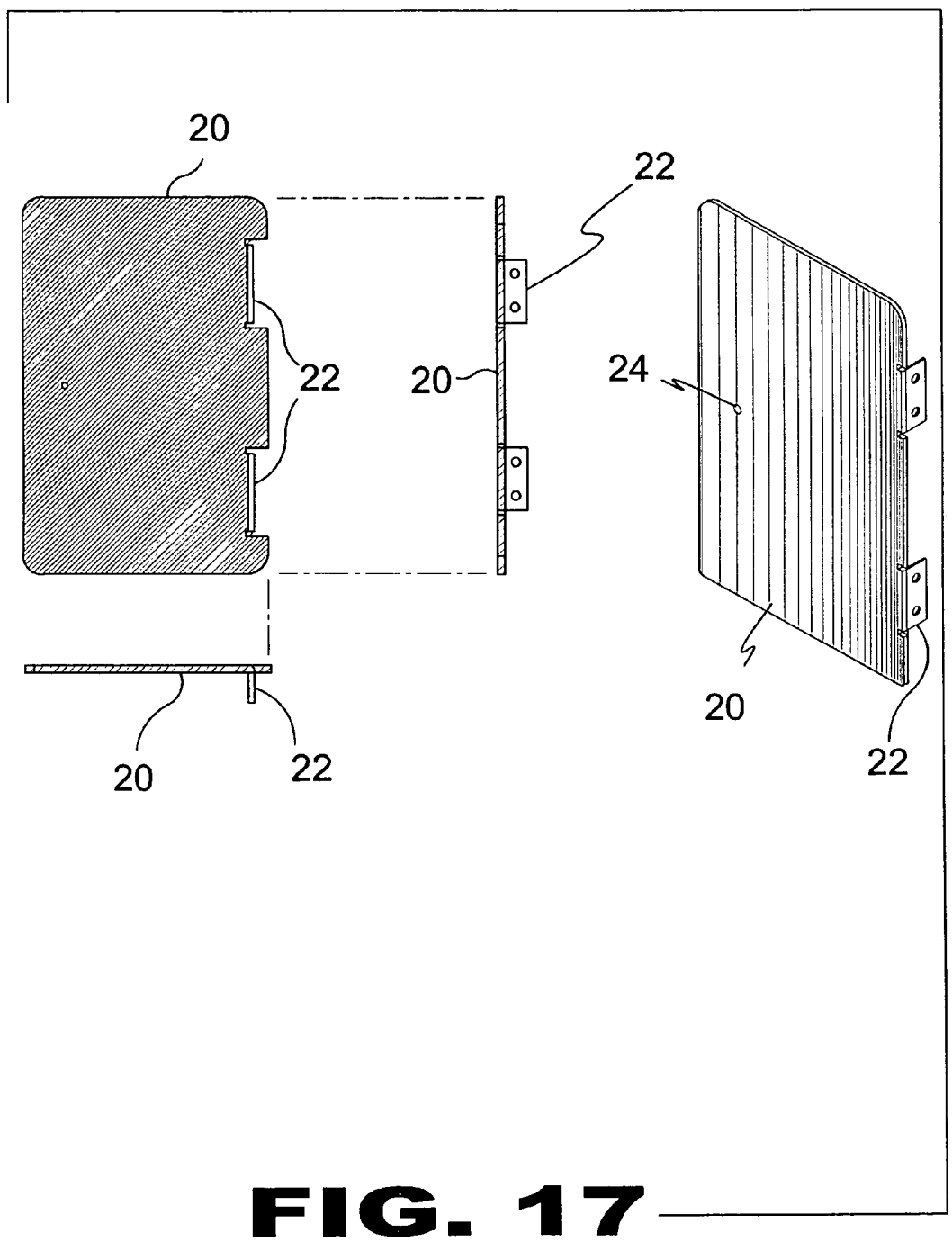
FIG. 17 is an orthographic view of the door of the present invention.

FIG. 17 is an orthographic view of the door 20 of the present invention. Shown is the door 20 portion of the oil filtration device of the present invention comprising a set of continuous hinge 22, door knob 24 and a catch for attachment to a magnetic catch located on the oil container inside wall, flush with the opening.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A used cooking oil processing apparatus comprising:
   a) a housing member having an open side and a drain insert recess on the top side thereof and a substantially hollow interior;
   b) an oil storage receptacle sized to fit into said interior of said housing having an recess disposed on the top side thereof;
   c) a substantially funnel shaped drain insert comprising:
      i) a superior end with a radius substantially similar to the radius of said drain insert recess thereby allowing said drain insert to be inserted into said insert recess;
      ii) a retaining flange extending from the edge of said superior end thus enabling said flange to be seated on the top of said housing; and
      iii) an inferior end having a radius smaller than that of said receptacle recess thereby allowing said inferior end to be inserted therein;
   d) means for filtering sediment debris and other particulate matter from said used cooking oil;
   e) a plurality of vibration mounts disposed on the bottom side of said housing to absorb any vibrations between said housing and the surface that it resides upon; and
   f) a hinged door disposed on said open side of said housing including a means for releasably securing said door in the closed position.

2. A used cooking oil processing apparatus as recited in claim 1, wherein said filtration means is a filter element disposed within drain insert.

3. A used cooking oil processing apparatus as recited in claim 2, wherein said filtration means further includes a skeletal filter cage that is removably positioned within said drain insert for retaining said filter element and preventing the deformation thereof.

4. A used cooking oil processing apparatus as recited in claim 3, wherein said filtration means further includes a plurality of tass hooks interiorly disposed in a superior location of said drain insert for suspending said filter cage therein.

5. A used cooking oil processing apparatus as recited in claim 2, wherein said filter element is fabricated from a fibrous, porous material that will permit liquid to pass through without being compromised.

6. A used cooking oil processing apparatus as recited in claim 5, wherein said filter element is fabricated from paper.

7. A used cooking oil processing apparatus as recited in claim 6, wherein said door-securing means is a catch comprised of a magnetic catch element and a mating metallic catch element.

8. A used cooking oil processing apparatus as recited in claim 7, wherein said magnetic catch element is disposed on said housing and said metallic catch element is disposed on said door.

9. A used cooking oil processing apparatus as recited in claim 1, wherein said drain insert is inserted into said drain recess to introduce unfiltered cooking oil into said oil storage receptacle.

10. A used cooking oil processing apparatus as recited in claim 6, wherein said drain insert is inserted into said drain insert recess, said filter cage is suspended from said tass hooks of said drain insert and said filter insert is deposited into said filter cage and said used cooking oil is poured into said filter element to introduce filtered, used cooking oil into said oil storage receptacle.

\* \* \* \* \*